United States Patent [19]

Guiller

[11] 4,073,158
[45] Feb. 14, 1978

[54] APPARATUS FOR FREEZING SMALL DROPS OF LIQUID

[76] Inventor: Jacques Guiller, Rue de France, Ansouis, France

[21] Appl. No.: 628,785

[22] Filed: Nov. 4, 1975

[30] Foreign Application Priority Data

Nov. 7, 1974 France .................. 74 37010
Mar. 13, 1975 France .................. 75 07868
Sept. 30, 1975 France .................. 75 29923

[51] Int. Cl.² ............................................. F25C 1/00
[52] U.S. Cl. ........................................ 62/266; 62/64; 62/347; 426/524
[58] Field of Search .......... 62/74, 347, 64, 268, 62/260, 266; 426/524, 599, 588

[56] References Cited

U.S. PATENT DOCUMENTS

| | | | |
|---|---|---|---|
| 3,006,774 | 10/1961 | Zebarth | 62/64 X |
| 3,024,117 | 3/1962 | Barlow | 62/64 X |
| 3,162,019 | 12/1964 | Porter et al. | 62/74 X |
| 3,361,578 | 1/1968 | Hirtensteiner | 62/64 X |
| 3,368,363 | 2/1968 | Alaburda et al. | 62/64 |
| 3,758,257 | 9/1973 | Dastur | 426/524 X |
| 3,774,524 | 11/1973 | Howard | 62/64 X |
| 3,793,937 | 2/1974 | Lipoma | 62/64 X |

Primary Examiner—William E. Wayner
Assistant Examiner—William E. Tapolcai, Jr.
Attorney, Agent, or Firm—Karl W. Flocks

[57] ABSTRACT

The invention relates generally to a method permitting the production from a mass of product in the liquid or pasty state, of balls or granules of small sizes. More precisely this method consists of injecting this product under pressure into a refrigerant liquid which is under the physical conditions of passage to the gaseous state, this injection having the effect of atomizing the said product into the refrigerant liquid and forming therefrom deep-frozen balls or granules, the dimensions of which are a function of the difference in temperature between the injected product and the refrigerant liquid, and also of the injection pressure of this product. The invention has also for its object the apparatus for carrying the said method into effect and the alternative forms of such apparatus. The invention is also directed to the balls or granules thus obtained and it finds especially advantageous applications in the food preparation industries.

4 Claims, 3 Drawing Figures

APPARATUS FOR FREEZING SMALL DROPS OF LIQUID

The present invention relates generally to a method permitting the production, from a mass of product in the liquid or pasty state, of balls or granules of small size.

The invention is also directed to the balls or granules thus obtained, and it finds especially advantageous applications in the food preparation industries.

It is known that when a liquid is injected under pressure into a gaseous atmosphere under a lower pressure, a practically instantaneous atomization of this liquid takes place into the gas.

Now, the applicant has observed that a phenomenon of the same kind, namely an atomization, becomes apparent in the case of injection, under certain pre-determined conditions, of a liquid or pasty product into a refrigerant liquid. This phenomenon forms the basis of the invention.

More precisely, the invention has for its object a method of conversion of a mass of non-gaseous fluid product to deep-frozen balls or granules, this method being characterized by the fact that it consists of injecting this product under pressure into a refrigerant liquid which is under the physical conditions of passage to the gaseous state, this injection having the effect of atomizing the said product into the refrigerant liquid and forming therefrom deep-frozen balls or granules, the dimensions of which are a function of the difference in temperature between the injected product and the refrigerant liquid, and also of the injection pressure of this product.

According to an improved alternative form of the said method, as soon as deep-frozen balls have been obtained by means of the refrigerant liquid, these are carried away into a tank under vacuum without any intermediate passage to free air, in order to effect the almost complete evaporation of the refrigerant liquid with which these balls are impregnated, and the liquid thus evaporated is re-introduced into the deep-freeze chamber in which the balls are formed.

According to another improved alternative form of the said method, the deep-freeze chamber is rendered fluid-tight by means of any system which permits the evacuation of the deep-frozen products and the said deep-freeze chamber is put under over-pressure, the value of which is regulated by acting on the flow-rate of the product injected into the refrigerant liquid, this over-pressure having the effect of increasing the boiling temperature of the said refrigerant liquid.

The invention has also for its object the apparatus for carrying the said method into effect and the alternative forms of such apparatus.

Other characteristic features and advantageous of the invention will be brought out in the description which follows below, reference being made to the accompanying drawings which show by way of explanation but not in any restrictive sense, various possible forms of embodiment of the said invention.

In accordance with the method of the invention, it has been seen that a non-gaseous fluid product under pressure is injected into a refrigerant liquid which is present under the physical conditions of passage to the gaseous state, that is to say those of evaporation. This injection has the effect of spraying the said product into this liquid and of forming therefrom deep-frozen balls or granules, the dimensions of which are a function of the difference in temperature between the injected product and the refrigerant liquid, and also of the injection pressure of this product.

The atomization effect is maintained in the liquid by a variation of surface tension due to the difference in temperature between the product injected and this liquid, for the time necessary for the desired reaction with this liquid.

Figure 1:
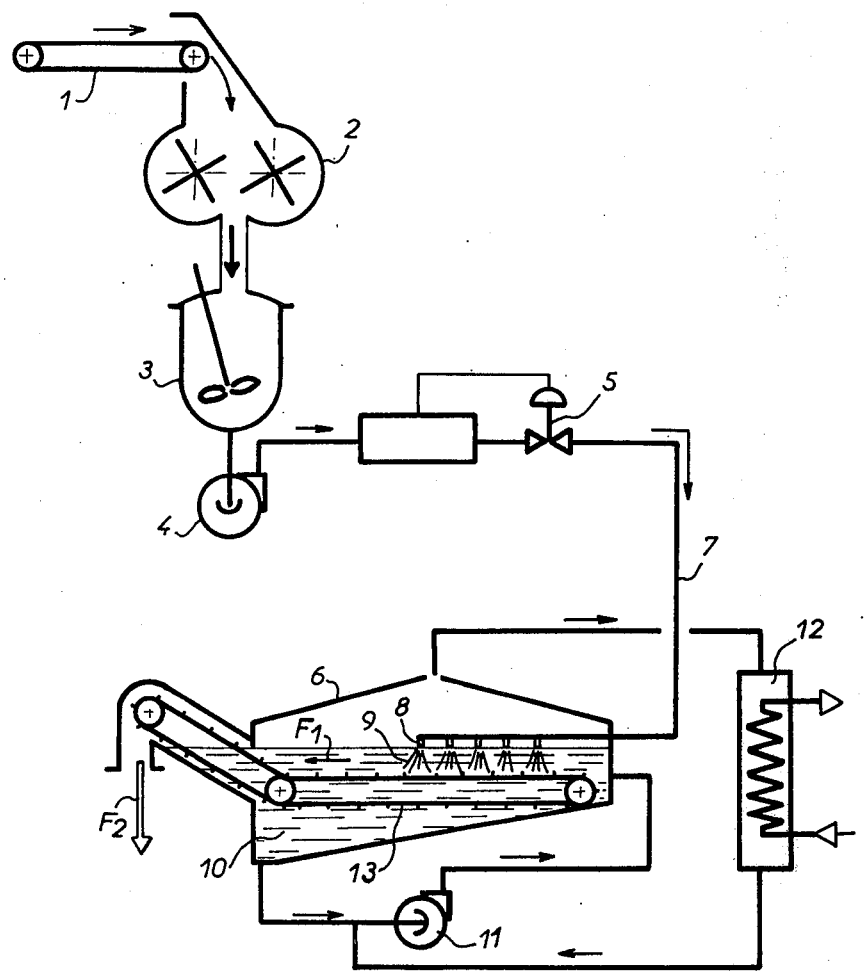
FIG. 1 represents in a diagrammatic manner an installation for carrying into effect the method according to the invention, this installation making use of the evaporation of a refrigerant liquid and being intended for the production of deep-frozen granules, for example granules of fruit pulp.

According to the example of application corresponding to FIG. 1, the fruits are introduced by a conveyor belt 1 into a crushing-mill 2 and thence into a mixer 3.

The fruit pulp passes out of this mixer and into the apparatus proper according to the invention. This apparatus comprises essentially, on the one hand an injector under pressure 4, on the downstream side of which is mounted an electro-valve 5 of the retro-action type serving to regulate the pressure, and on the other hand, a deep-freeze chamber 6.

The pulp passing out of the mixer 3 and which is at a given temperature, penetrates into the injector 4 which sends it under a given pressure into a conduit 7 provided at its downstream extremity with nozzles 8 which send jets 9 of fruit pulp into the refrigerant liquid 10 (for example liquid nitrogen or "Freon") contained in the chamber 6; this latter may be of any type currently employed in industry (with a pump 11 and an exchanger or condenser 12).

In the refrigerant liquid 10 there are formed, in an almost instantaneous manner, deep-frozen balls or granules which are carried away by a belt conveyor 13 (arrow $F_1$) and pass out of the apparatus (arrow $F_2$).

The dimensions of these deep-frozen balls or granules are a function of the difference in temperature between the injected product (fruit pulp) and the refrigerant liquid 10, of the injection pressure and of the content of dry material in the pulp.

These dimensions can be regulated in particular by acting on the ejector 4 and suitably choosing the refrigerant liquid.

At their outlet from the chamber 6, the deep-frozen balls may be subjected to a subsequent treatment (of lyophilization for example) or they may be utilized directly.

An improved alternative form of application of the method according to the invention consists, after deep-frozen balls have been obtained by means of the refrigerant liquid, in carrying these balls away into a tank under vacuum without any intermediate passage in free air, so as to induce the evaporation of practically all the refrigerant liquid with which these balls are impregnated, and in re-introducing the liquid thus evaporated into the chamber in which the balls are formed.

Figure 2:
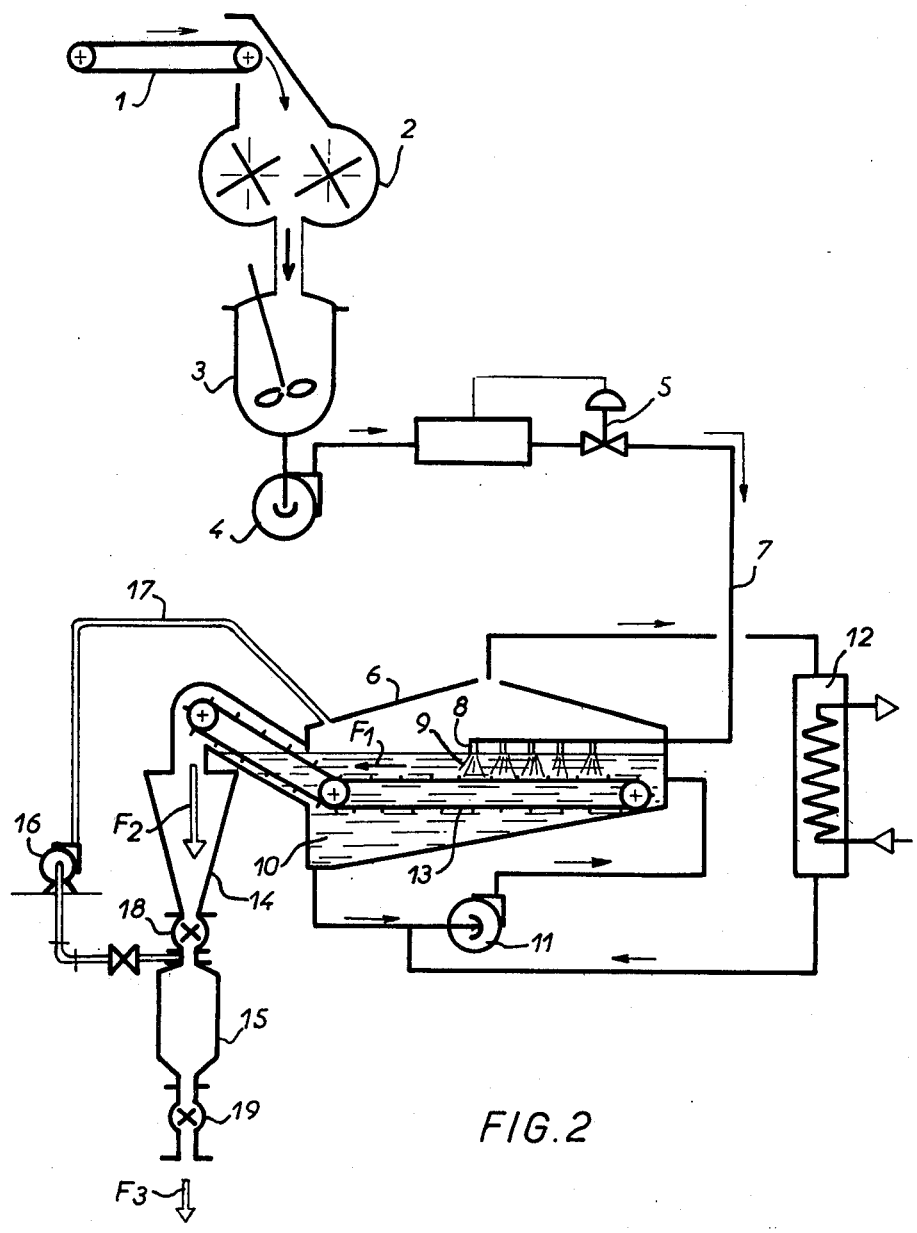
FIGS. 2 and 3 show diagrammatically two alternative forms of construction of an installation according to the invention, these alternatives providing various improvements.

An installation intended for carrying this improved application of the method into effect is shown diagrammatically in FIG. 2.

It should be observed that this FIG. 2 reproduces FIG. 1 exactly, with the same reference numbers, to which have been added the characteristic parts of the apparatus intended for this improved application.

These characteristic parts consist essentially of a spout 14 mounted on the outlet of the deep-freeze chamber 6, a tank 15 provided below this spout, a vacuum pump 16, a conduit 17 coupling the pump to the chamber 6, and vane-type distributors 18 and 19.

The whole assembly of these elements is mounted so as to be fluid-tight with respect to the ambient air.

The refrigerant product is an expensive product (especially in the case of "Freon"); there is therefore an advantage in recovering it.

Furthermore, from the hygiene point of view, it is desirable that the deep-frozen balls, which are intended for consumption, comprises as little as possible of this refrigerant product.

As can be seen later, these elements enable these advantages to be ensured and in addition permit the supply of deep-frozen balls free from pollution, due to the fact that before passing out of the apparatus, they were under vacuum.

The operation of these characteristic elements is as follows:

At their outlet (arrow $F_2$) from the deep-freezing chamber 6, the deep-frozen balls fall into the spout 14 and from thence into the tank 15, after having passed through the vane-distributor 18.

By means of this vane-distributor and an identical distributor 19 mounted at the bottom of the tank 15, the vacuum which is obtained in this tank can be maintained in a satisfactory manner.

As soon as the tank 15 contains the desired quantity of deep-frozen balls, the vacuum pump 16 is started-up. Under the effect of the vacuum obtained, the refrigerant liquid with which the balls are impregnated becomes evaporated and is sent through the conduit 17 into the deep-freeze chamber 6, in which it is put back into circuit.

Whereas with conventional installations there is a loss of refrigerant liquid (for example "Freon") of the order of 5%, the recovery of this liquid ensured in accordance with the arrangement shown in FIG. 2, reduces this loss to about 1.5 per thousand.

The apparatus constructed according to FIG. 2 also ensures a considerable reduction in the temperature of the balls, these latter passing out of the tank 15 at a right-through temperature of about −45°, that is to say at a temperature fairly close to the optimum conditions for subsequent treatment of the balls.

At their outlet from the tank 15 through the lower vane-distributor 19, the balls are in a perfect condition of hygiene, they contain practically no refrigerant liquid and, not having been subjected to free air, they are in no way polluted, whereas in conventional installations it is necessary to leave the product in free air for a period sufficient for the refrigerant liquid to evaporate.

At their outlet (arrow $F_3$) from the lower vane-distributor 19, the balls may be introduced directly into a bag or alternatively they may be subjected to a treatment (lyophilization for example) and all these operations can be carried out under the best conditions of hygiene. Thus, granules of natural fruit juice can be subjected to the lyophilization system used for coffee, without having to be previously pasteurized, it being possible to carry out the pasteurization at the moment of use.

Finally, the apparatus according to the invention ensures an excellent power efficiency (of the order of 98%) since the losses are practically nil.

For the purpose of continuous operation, tanks identical to the tank 15 of FIG. 2 may be provided, these tanks being mounted in parallel and operating alternately, each of them comprising an upper vane-distributor 18 and a lower distributor 19 and being branched on the vacuum-pump 16.

Another alternative form of improved application of the method according to the invention consists of rendering the deep-freeze chamber fluid-tight by means of any system permitting the evacuation of the deep-frozen products, and of putting the said deep-freeze chamber on over-pressure, the value of which is regulated by acting on the flow-rate of the product injected into the refrigerant liquid, this over-pressure having the effect of increasing the boiling temperature of the said refrigerant liquid.

In addition, the refrigerant liquid contained by the deep-frozen products passing out of the deep-freeze chamber on over-pressure is advantageously recovered and is re-injected by any other appropriate means into the said deep-freeze chamber.

Figure 3:
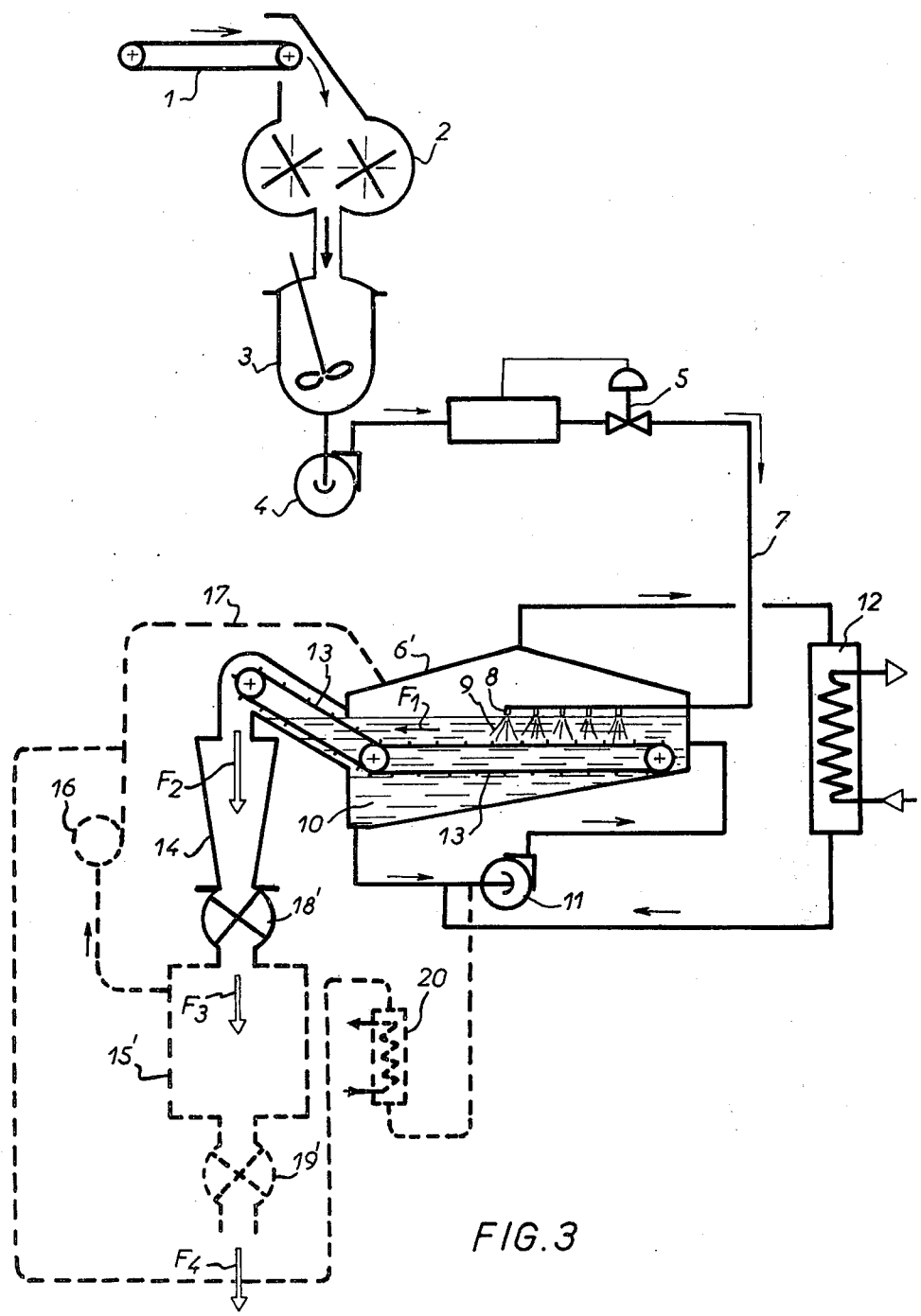

An installation permitting the carrying into effect of this latter improved method is shown in FIG. 3.

It should be observed that in order to avoid useless increase in the number of drawings, there have been shown on this same FIG. 3; on the one hand, in full lines, the parts necessary and sufficient for carrying out the improvement concerning the application of over-pressure, and on the other hand, in broken lines, complementary elements capable of being employed advantageously when so desired, for the recovery and re-injection of the refrigerant liquid.

Like those previously described in detail, the apparatus shown in FIG. 3 makes use of the evaporation of a refrigerant liquid (for example liquid nitrogen, or "Freon" or liquid carbon dioxide) and it is intended for the preparation of deep-frozen balls, for example balls of fruit pulp.

According to the essential characteristic feature of this second alternative form of the improved application of the method according to the invention, the deep-freeze chamber 6 is made fluid-tight designated in FIG. 3 as fluid-tight deep-freeze chamber 6' and is put under over-pressure in an adjustable manner. An over-pressure of the order of 1.5 bars is generally applied.

In order that the system ensuring fluid-tightness does not interfere in any way with the evacuation of the deep-frozen products carried away by the bucket elevator-conveyor device 13, the form of construction shown by way of example in FIG. 3 can advantageously be adopted.

According to this form of embodiment, the outlet of the deep-freeze chamber 6' is provided with a spout 14 into which the deep-frozen products brought in by the elevator 13 fall in the direction of the arrow $F_2$.

This spout 14 opens into a rotary lock chamber 18' with vanes permitting the evacuation of the deep-frozen products in the direction of the arrow $F_3$ without thereby interrupting the fluid-tightness of the deep-freeze chamber.

It will immediately be seen that by regulating the flow-rate of the products to be treated, discharged through the nozzles 8, especially by acting on the injector 4, and its electro-valve 5, it is possible to regulate the over-pressure existing inside the chamber 6' to the value desired. Tests have shown that the over-pressure to be employed was generally of the order of 1.5 bars.

This over-pressure has the immediate consequence of increasing the boiling temperature of the refrigerant fluid 10, and in consequence may permit either of increasing the difference in temperatures between that of the gaseous vapours contained in the chamber and that of the fluid which evaporates within the coil of the condenser 12 and of reducing the surface of exchange, or, if the same difference in temperatures is maintained of reducing the energy consumption which is required for producing the cold.

The result of this is that a single condenser 12 in this case may have its capacity considerably increased with respect to that which it has by causing the deep-freeze chamber 6 to work at atmospheric pressure, as in the case of FIG. 1 and/or that the energy consumption required for the cold production can be reduced.

In other words, it is apparent that by working on over-pressure as has just been explained, in the case of the apparatus shown in FIG. 1, the potential is increased without thereby modifying the power necessary for its operation.

In conclusion, it is clear that deep-freezing in a chamber under over-pressure makes it possible to effect an economy of power which is proportional to the increase in efficiency of the condenser.

Tests carried out by the applicant have proved that the deep-freeze times and also the quality of the deep-frozen products obtained on over-pressure remain equal to those obtained by deep-freezing at atmospheric pressure.

According to another characteristic feature of the invention, it is advantageously possible, when so desired, to recover the refrigerant product impregnating the treated products passing out of the rotary lock-chamber 18', and all the more so when the refrigerant product employed is expensive and when the treated product is one in which all pollution must be strictly avoided.

To this end, and following a process known per se, the deep-frozen products passing out of the rotary lock-chamber 18' are caused to fall into an expansion chamber 15', closed in a fluid-tight manner by another output rotary lock-chamber 19'.

In this expansion chamber 15', the refrigerant liquid contained by the treated products is evaporated by inducing a considerable fall in temperature of the said products, which are then evacuated in the direction of the arrow $F_4$ by the rotary lock-chamber 19'.

The refrigerant liquid vapours may be re-injected into the apparatus, either in the gaseous form by means of a pump 16 connected by a conduit 17 to the interior of the deep-freeze chamber 6' on over-pressure, or in the liquid form by causing them to pass through a condenser 20, the outlet of which is connected, for example on the upstream side of the pump 11 which is coupled in turn on the circulation conduit of the refrigerant liquid 10.

I claim:

1. An apparatus for the conversion of a mass of non-gaseous fluid product to deep-frozen balls or granules, said apparatus comprising:
   a deep-freeze chamber rendered fluid-tight, in which a refrigerant liquid is contained under the physical conditions of passage to the gaseous state;
   an injector system for injecting said fluid product under pressure into said refrigerant liquid;
   an extractor-conveyor for the deep-frozen balls or granules obtained in said refrigerant liquid;
   an outlet lock-chamber permitting the evacuation of the deep-frozen products without adversely affecting the fluid-tightness;
   means for regulating the flow-rate of said injector system, said means being put into service in order to produce an appropriate over-pressure in the interior of said deep-freeze chamber.

2. An apparatus for converting a mass of non-gaseous fluid product to deep-frozen balls or granules, said apparatus comprising:
   a deep-freeze chamber rendered fluid-tight in which a refrigerant liquid is contained under the physical conditions of passage to the gaseous state;
   an injector system for injecting said fluid product under pressure into said refrigerant liquid;
   an extractor-conveyor for the deep-frozen balls or granules obtained in said refrigerant liquid;
   an outlet lock-chamber permitting the evacuation of the deep-frozen products without adversely affecting the fluid-tightness;
   means for regulating the flow-rate of said injector system, said means being put into service in order to produce an appropriate over-pressure in the interior of said deep-freeze chamber;
   an expansion chamber arranged following said outlet lock-chamber and said deep-freeze chamber on over-pressure, connected to means for recovery of said quantity of refrigerant fluid impregnating said deep-frozen products passing out of said deep-freeze chamber.

3. An apparatus as claimed in claim 2, in which said quantity of refrigerant fluid recovered in said expansion chamber is re-ejected in the gaseous form into the interior of said deep-freeze chamber on over-pressure.

4. An apparatus as claimed in claim 2, in which said quantity of refrigerant fluid recovered in said expansion chamber is reliquefied and then re-injected into the refrigerant liquid of said deep-freeze chamber on over-pressure.

* * * * *